G. A. McCORMACK.
SNAP FASTENER.
APPLICATION FILED JULY 20, 1908.

933,194. Patented Sept. 7, 1909.

WITNESSES:
Charles D. Woodbury
Josephine H. Ryan

INVENTOR:
George A. McCormack,
By Roberts, Roberts & Cushman
his attorneys

UNITED STATES PATENT OFFICE.

GEORGE A. McCORMACK, OF SOUTH BOSTON, MASSACHUSETTS, ASSIGNOR TO UNITED STATES FASTENER COMPANY, OF BOSTON, MASSACHUSETTS, A CORPORATION OF MAINE.

SNAP-FASTENER.

933,194.   Specification of Letters Patent.   Patented Sept. 7, 1909.

Application filed July 20, 1908. Serial No. 444,307.

*To all whom it may concern:*

Be it known that I, GEORGE A. McCORMACK, a citizen of the United States, and resident of South Boston, in the county of Suffolk and State of Massachusetts, have invented new and useful Improvements in Snap-Fasteners, of which the following is a specification.

My invention relates to snap fasteners and more particularly to that class of snap fasteners in which the socket member comprises a stud engaging spring within a casing. In fasteners of this class as heretofore made, the stud engaging spring is not equally resilient in all directions and consequently the pinch of the spring upon the stud is not uniform so that the tension necessary to pull the stud from the socket is not the same in all directions. It has therefore been necessary in assembling the parts of these fasteners to face the spring in a predetermined position and thereafter to attach the fastener member to fabric or apparel in a definite position so that the stud can be disengaged with the desired tension, and also to provide some means whereby the spring is prevented from changing its position by rotating in the casing. This necessity for careful adjustment of the spring has proved a cause of annoyance and expense, not only because of the necessity of providing some device to prevent rotation of the spring but also because the work of assembling the parts is seriously retarded thereby.

It is the object of this invention to provide a stud retaining device of the kind described wherein the spring is equally resilient in all directions, the pinch upon the stud substantially uniform, and which will not require careful adjustment in the casing but may rotate therein without detrimental results.

Figure 1:
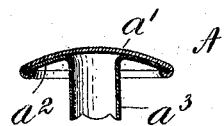
Figure 2:
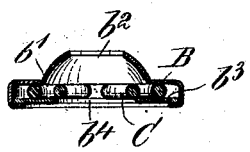
Figure 3:
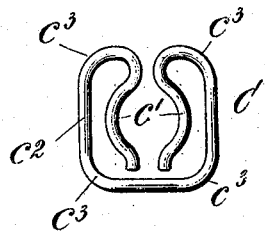
Figure 4:
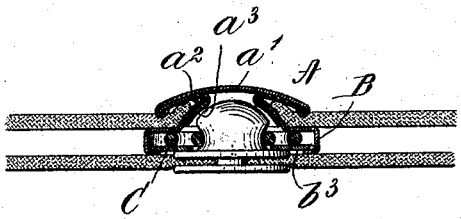

Referring to the drawings,—Figures 1 and 2 are respectively sectional views of the upper and lower portions of a socket member; Fig. 3 is a plan view of a stud engaging spring; and Fig. 4 shows partly in section and partly in elevation a snap fastener attached to material.

A is the upper section of a socket member and comprising a cap $a'$ clenched over a disk $a^2$, said disk having an eyelet $a^3$ adapted to pass through the material.

B is the lower section of a socket member and comprises a cylindrical casing $b'$ having an opening $b^2$ adapted to receive the eyelet $a^3$. A collet $b^3$ having a stud receiving opening $b^4$, holds the stud engaging spring C within the cylindrical casing $b'$; said spring may be loosely secured and free to rotate within the casing; devices to fix the spring in a definite position are unnecessary with these improvements. The said spring C comprises central stud gripping arms $c'$ and an integral outer rim $c^2$, the latter being preferably substantially rectangular in shape as shown in Fig. 3. The outer rim of the spring C has localized centers of flection at points $c^3$ symmetrically disposed about the central stud gripping arms $c'$ so that the spring C is equally resilient in all directions and consequently the stud gripping arms $c'$ exert a substantially uniform pinch upon the stud and the tension necessary to disengage the stud is the same in all directions.

By reason of the fact that the spring C is equally resilient in all directions, no device need be provided to prevent rotation of the spring within the casing after the parts are assembled; and the fact that the spring may be left free to rotate, eliminates the necessity of painstaking adjustment of the spring when the parts are assembled and of thereafter attaching the fastener member to material in a predetermined position. By this construction, therefore, the annoyance and expense incident to the necessity of providing means to prevent rotation of the spring and the retardation of the work of assembling the parts, is wholly eliminated.

What I claim and desire to secure by Letters Patent is:

A socket member of a snap fastener, comprising two parts to be seated on opposite sides of material, one part comprising a cap, a disk within said cap, an eyelet integral with said disk, the other part comprising an annular casing having an opening adapted to receive said eyelet, a stud-engaging spring loosely secured and adapted to turn within said casing and comprising central substantially circular stud gripping arms and an integral substantially rectangular outer rim, said spring being equally resilient in all directions.

Signed by me at Boston, Massachusetts, this sixth day of July 1908.

GEORGE A. McCORMACK.

Witnesses:
E. C. M. WEBBER,
G. A. HOLMES.